United States Patent [19]
Herz et al.

[11] Patent Number: 5,351,075
[45] Date of Patent: Sep. 27, 1994

[54] HOME VIDEO CLUB TELEVISION BROADCASTING SYSTEM

[76] Inventors: Frederick Herz, P.O. Box 42891, Philadelphia, Pa. 19101; Michael Negin, 1909 Hollinshed Rd., Pennsauken, N.J. 08110

[21] Appl. No.: 497,105

[22] Filed: Mar. 20, 1990

[51] Int. Cl.$^5$ .................................. H04B 17/00
[52] U.S. Cl. .................................. 348/1; 455/2
[58] Field of Search .................... 455/2, 4.1, 4.2; 358/84, 86; 348/1, 3

[56] References Cited

U.S. PATENT DOCUMENTS

| | | | |
|---|---|---|---|
| 4,381,522 | 4/1983 | Lambert | 358/86 |
| 4,506,387 | 3/1985 | Walter | 455/612 |
| 4,521,806 | 6/1985 | Abraham | 358/86 |
| 4,567,512 | 1/1986 | Abraham | 358/86 |
| 4,590,516 | 5/1986 | Abraham | 358/86 |
| 4,745,549 | 5/1988 | Hashimoto | 358/84 |
| 4,761,684 | 8/1988 | Clark et al. | 358/86 |
| 4,763,191 | 8/1988 | Gordon et al. | 358/86 |

FOREIGN PATENT DOCUMENTS 8606050 10/1986 World Int. Prop. O. .

*Primary Examiner*—Reinhard J. Eisenzopf
*Assistant Examiner*—Andrew Faile
*Attorney, Agent, or Firm*—Woodcock Washburn Kurtz MacKiewicz & Norris

[57] ABSTRACT

A method and system for providing access to a plurality of video programs of a video library in accordance with viewer preferences. Members of the Home Video Club of the invention may phone in or write in their video program choices and the received viewer choices are tabulated in accordance with a selection priority scheme at the transmission side so that the most popular video programs as determined by the voter choices may be broadcast more regularly for the viewer's convenience. For this purpose, a "prime time" viewing period is defined in accordance with the viewer preferences so that the more popular video programs can be shown more frequently to meet viewer demand. The selected video programs are broadcast over rented or dedicated cable television channels for reception by the viewer. The received video programs may then be recorded and time-shifted so that the viewers may view the video programs at their leisure. The technique of this invention is particularly advantageous in that the broadcast system is directly responsive to the viewer preferences and is dynamically programmable in accordance with those preferences so that differing numbers of regular and prime time programs may be viewed in a given time period. Revenue may be raised by charging for the viewer's calls and by the subscription fee for joining the Home Video Club.

34 Claims, 6 Drawing Sheets

|    | 2 | 4 | 6 | 8 | 10 | NOON 12 | 14 | 16 | 18 | 20 | 22 | 24 |
|----|---|---|---|---|----|---------|----|----|----|----|----|----|
| Su |   |   |   |   |    |         |    |    |    |    |    |    |
| M  |   |   |   |   |    |         |    |    |    |    |    |    |
| Tu |   |   |   |   |    |         |    |    |    |    |    |    |
| W  |   |   |   |   |    |         |    |    |    |    |    |    |
| Th |   |   |   |   |    |         |    |    |    |    |    |    |
| F  |   |   |   |   |    |         |    |    |    |    |    |    |
| Sa |   |   |   |   |    |         |    |    |    |    |    |    |

MASTER SCHEDULE

2 HOUR INTERVALS = 12 PROGRAMS / DAY

NO PRIME TIME = 84 PROGRAMS / WEEK $\frac{M}{84}$ = # CHANNELS, WHERE M IS THE NUMBER OF PROGRAMS IN THE VIDEO LIBRARY TO BE TRANSMITTED IN A WEEK

*Fig. 2*

MASTER SCHEDULE

CHANNEL 1: 9-11pm = PRIME TIME = 1 PROGRAM/WEEK
ELSE = NON PRIME TIME = 7×11 PROGRAMS/DAY = 77 PROGRAMS/WEEK

CHANNELS 2→K  PRIME TIME = 1 PROGRAM/WEEK
NON PRIME TIME = 77 PROGRAMS/WEEK
78 TOTAL PROGRAMS/WEEK PER CHANNEL $\frac{M}{78}$ = # CHANNELS REQUIRED TO TRANSMIT M PROGRAMS IN A WEEK

MASTER SCHEDULE

ALL PRIME TIME SLOTS = 12 PROGRAMS / WEEK $\frac{M}{12}$ = # CHANNELS REQUIRED TO TRANSMIT M PROGRAMS IN A WEEK

HOME VIDEO CLUB TELEVISION BROADCASTING SYSTEM

BACKGROUND OF THE INVENTION

1. Field of the Invention

The present invention relates to a television broadcasting system for broadcasting prerecorded video programs over cable television channels, and more particularly, to a broadcasting system which provides customer access to a large variety of prerecorded video programs in accordance with customer preferences.

2. Description of the Prior Art

Systems are known which allow subscribers to choose what video programs they would like to view on their cable television channels. For example, in one such system a transmitting station scrambles the video and audio signal so that a conventional television cannot receive the signals clearly. A decoder is provided to each subscriber to unscramble the coded signal, and the use of the decoder is recorded for billing purposes. Thus, by using the decoder the subscriber may selectively view the information made available by the cable television company. However, the subscriber has no input as to what video programs are shown and must select from those programs provided by the cable television company at any given time.

Other systems exist which allow a subscriber to specify which video program is desired for viewing at a particular time. For example, private coaxial distribution networks exist which allow a transmitting station to simultaneously transmit a plurality of unscrambled subscription television program signals to a plurality of subscribers on a plurality of television channels. Each signal is transmitted at a different frequency which corresponds to a different television reception channel, and each subscriber is provided with a switching mechanism by which the subscriber may view the desired television channel. However, such a system is disadvantageous in that substantial start-up costs are required to set up the private coaxial distribution network and to add new subscribers, thereby reducing the accessibility of the system to the general public.

Additional broadcasting systems exist which allow a subscriber to select a video program using a command terminal unit at the subscriber's home. The command terminal unit is typically a microprocessor with a key pad coupled to the telephone system and the television cable. The subscriber uses the key pad to select the desired video program with the subscriber's selection being sent over the telephone lines. In response to such a request over the telephone system, the cable company sends the video information over the cable channel in a time compressed form to only the subscriber that requested the video program. The video program is then converted to real time before it is broadcast at the subscriber's home. Such a system is disclosed in U.S. Pat. No. 4,590,516 to Abraham, U. S. Pat. No. 4,567,512 to Abraham, and U. S. Pat. No. 4,506,387 to Walter, for example.

Further systems exist whereby a subscriber may select video information using only the subscriber's telephone, thereby obviating the need for a control unit at the subscriber's home. In such a system, the subscriber dials the cable television company and enters a digital code corresponding to the selected video information. The video information is then sent via a cable in time compressed form and broadcast to the subscriber requesting the video program. Such a broadcasting system is disclosed in U.S. Pat. No. 4 521 806 to Abraham, for example. However, as in the aforementioned prior art systems, the programming requests are processed in order and are not tabulated to schedule the broadcasts in accordance with generalized viewer preferences.

In yet another broadcasting system, such as in U.S. Pat. No. 4,381,522 to Lambert, a subscriber desiring to view a particular video program enters a digital code on the subscriber's telephone, the code corresponding to the selected video information. A minicomputer at the cable station responds to the viewer selection signals provided on the telephone line and outputs the selected video information on one of a plurality of channels. The channel and the start and stop times for the selected video program are displayed on the television monitor of all subscribers to the video system, and the program is then broadcast so that any subscriber interested in the program can view it. However, each program selected is typically assigned for broadcast in the order that it is received, although certain programs may be given higher priorities, such as, for example, emergency first aid information scheduled for immediate broadcast. In any event, Lambert does not provide a subscriber voting system whereby video programs preferred by the viewers may be given priority over other video programs.

Another broadcasting system which allows for subscriber selection of video programs has been disclosed by Clark et al. in U.S. Pat. No. 4,761,684. Clark et al. therein disclose a system in which a subscriber can input a digital code using a touch tone telephone for selecting a video program for broadcast on a cable channel. At the transmitter, the subscriber's request is used to retrieve the requested video information from memory and to place it on a queue for broadcast. A telephone company's "900" service may be used for this purpose so that income can be generated for the cable television company. On the other hand, as taught by Gordon et al. in U.S. Pat. No. 4,763,191, a dial-a-view service may be used whereby a subscriber desiring to view a particular video program dials an "800" dial-a-view number for ordering that selection through the telephone network. The local cable company is accordingly instructed to display the desired program in the order requested by the subscriber. In any event, the selected video program is then displayed on a common channel of the television monitors of all subscribers.

However, since the requests in both the Clark et al. and Gordon et al. systems are placed in a queue, the first video information selected by a subscriber is the first video information broadcast on the common channel. In other words, the requested video programs are prioritized for broadcast only according to the relative time that the subscriber's requests were received. Such systems have the obvious limitations that each subscriber has no idea when a requested video program will be shown, for the broadcasting time is completely dependent upon the number of previous video requests placed in the queue. A more responsive and predictable video system is required.

The subscriber selection difficulties inherent in each of the above systems have been partially circumvented by the growing video rental market. Video rental stores provide the renter with access to a large library of video programs without a wait for the particular program to be broadcast over one of the cable channels. Hence, maximum viewer flexibility has been obtained. However, since recent releases of popular first run movies are often difficult to obtain by the video stores and even more difficult to obtain by the patrons of the video stores since all available copies of the more popular videos are often rented quickly, the patrons of the video rental stores have often lost the above-mentioned viewing flexibility. They instead must sign a waiting list and make further trips to the video rental store before obtaining the desired video program. In fact, the patrons sometimes never get to see the video program they originally requested because they either lose interest or rent another selection. Such an arrangement remains an inconvenience to the patron of the video store.

Accordingly, there is a long-felt need in the art for a television broadcasting system which will provide the subscriber with the wide video selection of a video store without the limitations of previous broadcasting systems or the procurement problems of video rental. In particular, there is a need for a television broadcasting system which is more responsive to the desires of the viewers so as to enable the viewers to have more control over their own video programming. The present invention has been designed to meet this need.

SUMMARY OF THE INVENTION

The present invention overcomes the above-mentioned limitations of the prior art by allowing members of a "Home Video Club" to vote for programs that they wish to view during a predetermined time period. The system of the invention is thus designed to be responsive to viewer requests so as to allow dynamic adjustment of the programming schedule to satisfy the viewers' preferences.

In particular, the invention relates to a broadcast system for broadcasting video programs over at least one cable channel to a plurality of viewers who are members of a "Home Video Club". The members of the Home Video Club typically have viewer operated video recording systems (VCRs) and are given selective access to the broadcasted video programs in accordance with known techniques. The broadcasted video programs are then viewed and/or recorded for playback at each viewer's convenience. However, the system of the invention has the distinct advantage that the broadcast video programs are selected by the members of the Home Video Club in accordance with their preferences and arranged for broadcast using a selection priority scheme. The selected programs are then broadcast during predefined viewing periods which are either "prime time" or "non-prime time", depending upon the popularity of the selected video program and the priority selection scheme.

For example, the selected video programs may be scheduled by dividing a programming week into 84 two-hour time segments during which video programs may be broadcast to members of the Home Video Club. The members of the Home Video Club typically vote in one week for the video programs to be viewed the next week. In accordance with these votes, one or more prime time periods are established during which the more popular video programs are displayed for each day of the following week. The number and/or duration of the prime time periods is variable and is determined by the viewer preferences.

Thus, the programming schedule in accordance with the invention is dynamic and easily adaptable to viewer preferences. For example, if two particular video programs are clearly the most popular, both programs may be broadcast during a consecutive four hour prime time period during each day of the programming week. Then at the end of the programming week, the video programs shown during the prime time period may be changed to reflect the viewer preferences from the current week. Then, if only one particular video program is popular during the current week, the prime time viewing period may be shortened in the following week to two hours so that more of the other selected video programs may be displayed during other time periods. Moreover, the prime time period may be redefined on any basis that suits the system demand including a continuously variable or adjustable prime time period as well as a prime time period which is divided into either independently programmed contiguous or noncontiguous segments. Hence, the system of the invention has the capability to frequently schedule highly desired programs within a prime time period that is simultaneously dictated by a viewer preference-time relationship so as to vary in duration and timing in accordance with voter preferences. By continuously redefining the "prime time" period to suit the user demand in this manner, maximum viewer flexibility and convenience are achieved.

BRIEF DESCRIPTION OF THE DRAWINGS

The above and other objects and advantages of the invention will become more apparent and more readily appreciated from the following detailed description of the presently preferred exemplary embodiment of the invention taken in conjunction with the accompanying drawings, of which:

FIG. 2 schematically depicts a master schedule representing the time periods during which video programs may be broadcast in a given week.

DETAILED DESCRIPTION OF THE PRESENTLY PREFERRED EMBODIMENT

The present invention will be described with reference to the attached drawing figures. However, as will be appreciated by those of ordinary skill in the art, the present invention is described with respect to a particular embodiment only for purposes of explanation and is not intended to be limited to the particular features thereof. Rather, the scope of the present invention is intended to be limited only by the appended claims.

Figure 1:
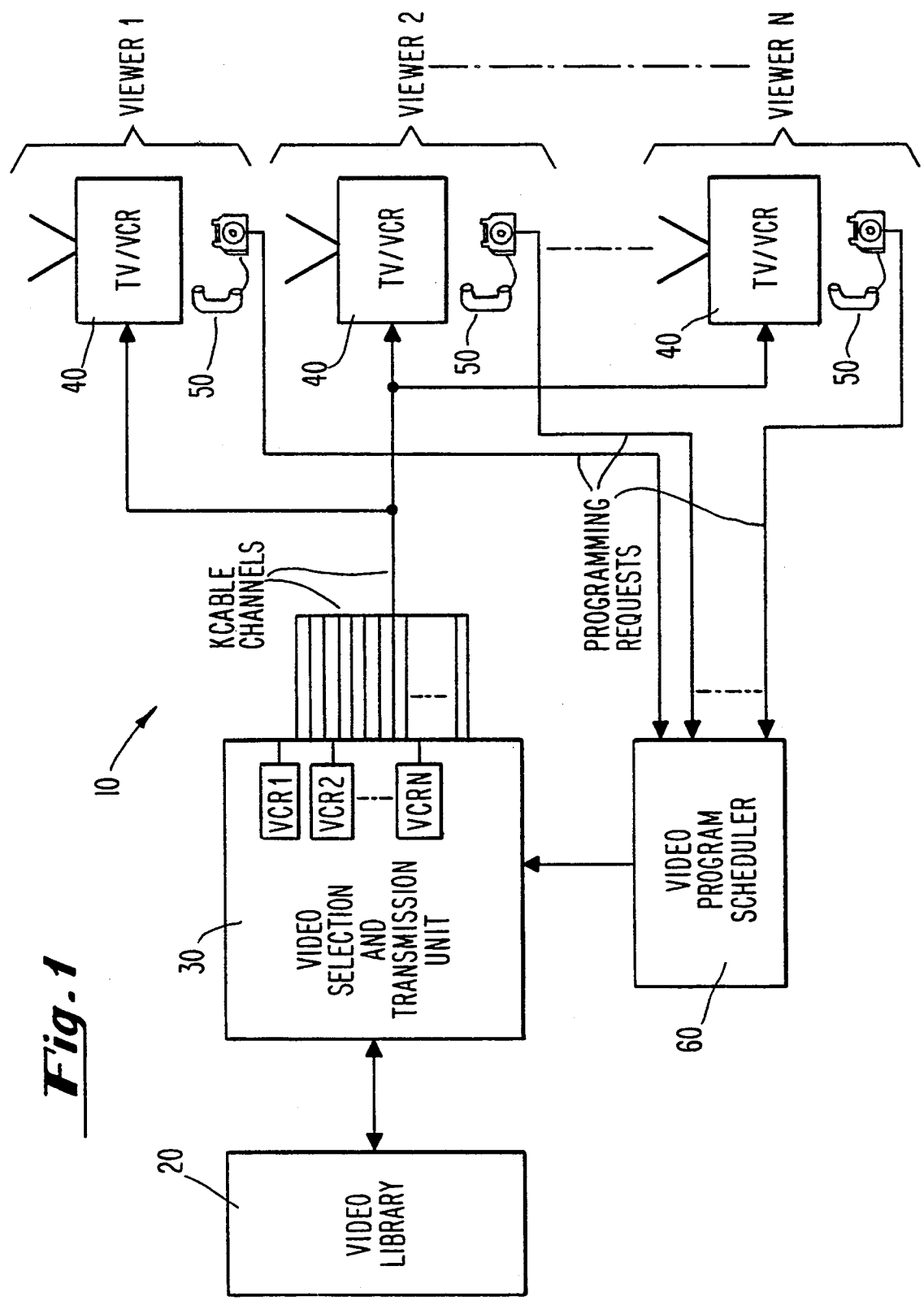
FIG. 1 is a schematic representation of a presently preferred embodiment of the invention.

FIG. 1 shows an embodiment of the Home Video Club television broadcasting system 10 in accordance with the invention. As shown, the prerecorded video programs stored in a video library 20 are made available to members of the Home Video Club (hereinafter "viewers") who have paid their membership fee by selecting the desired video programs using video selection and transmission unit 30. The selected video programs are then broadcast by video selection and transmission unit 30 over one or more rented or dedicated cable channels to the viewers. By way of example, the video selection and transmission unit 30 may comprise a set of video cassette recorder (VCR) units with multiple tape changers and a cable head end for broadcasting over the cable channels. However, any known means useable for video storage and retrieval, such as digital storage, compact discs, video discs and the like, may also be used. Also, the process may be completely automated or subject to operator control. Moreover, as will be described below, the number of cable channels for broadcast depends on the size of the club and is also dependent upon the number of video programs to be accessed from the video library 20 in a given week as well as the number of "prime time" video programs to be broadcast. Therefore, the basis for the number of cable channels necessary to fill user demands is not self-limiting.

Each viewer receives the broadcasted video program via the viewer's television and VCR 40 for either immediate viewing or time-shifted program access. In other words, requested programs which are shown in the middle of the night or while the viewer is away may be videotaped for time-shifted viewing. Such requests are made by the viewers in accordance with the invention by selecting the desired video program using a sophisticated voting system utilizing, for example, a weighted statistical technique following predetermined priority rules, thereby allowing a much richer schedule variety. The viewer preferences (votes) may be provided by telephone using the viewer's telephones 50 as shown, by facsimile transmission, mailed-in ballots, ballots left at supermarkets and the like, or by some other similar method as would be apparent to one of ordinary skill in the art. The viewer preferences are then received by video program scheduler 60 at the broadcast station and tabulated on a regular basis. The tabulated results are then used in accordance with the aforementioned weighted statistical technique to determine the broadcast schedule. In other words, video program scheduler 60 specifies to the video selection and transmission unit 30 which video programs are to be selected from the video library 20 and at what times they are to be displayed.

Thus, in accordance with the invention a large number of viewers are given access to a large variety of video programs stored in video library 20 in accordance with the viewers' preferences by time-shifting of the program access. The video program scheduler 60 makes this process more practical by defining a "prime time" viewing period during which each cable channel has a highly desired video program, as determined from viewer voting from the previous week, for example. Such voting can be made by referring to a list of all videos available from the video library 20 as well as to video magazines disclosing upcoming releases, the date of release, and the like. "Prime time" is defined in accordance with the invention as a variable time period during which the same highly desired video program or programs are repeated at the same time of day for a number of consecutive days, preferably a week. During the other periods of the day (non-prime time), different video programs are shown during each of the respective time slots in accordance with the viewer preferences. Accordingly, a single cable channel typically will provide in a given week one or more prime time selections and a plurality of non-prime time selections.

FIG. 2 represents a master schedule for purposes of explaining the video programming in accordance with the invention. As shown, each day is preferably divided into 12 uniformly distributed two-hour time intervals by video program scheduler 60 since most video programs are close to two hours in duration or may be expanded by program filler to be two hours in length. However, those of ordinary skill in the art will appreciate that shorter or longer time durations for each video interval are possible in accordance with the invention and that, as a result, different numbers of video programs may be shown on different days. Obviously, such variations result in more complicated programming. As shown, for purposes of description each time interval is two hours in duration so that 84 programs may be shown in a given week on each cable channel. Thus, the full number of video programs available to the viewers from the video library 20 in a given week is determined by the number of channels multiplied by the number of programs which can be displayed on each channel in a given week.

Figure 3:
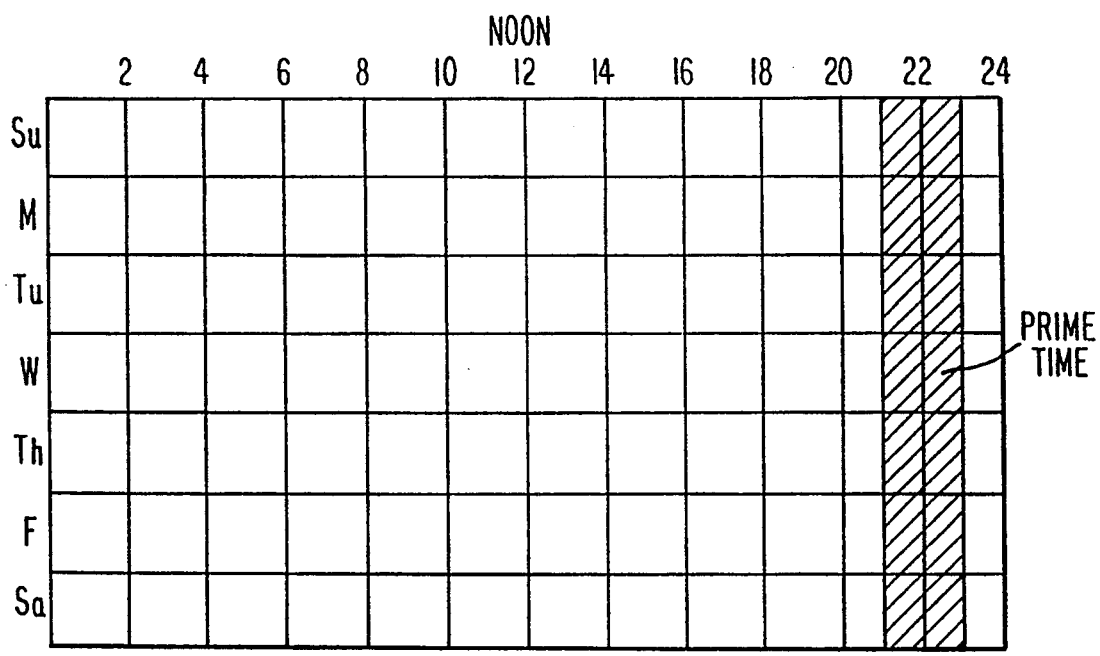
FIG. 3 schematically depicts a master schedule having a prime time period of 9 to 11 P.M. during which a "popular" video program is broadcast every day of the week.

FIG. 3 shows a master schedule in which a prime time period of 9 to 11 P.M. is defined during which a single video program is displayed for every day of the broadcast week. All other time intervals are defined as non-prime time, and as shown, 77 such non-prime time programs are available in that week. Thus, by referring to his or her program guide, the viewer can selectively record any or all of up to 78 selections and view them at his or her convenience by time-shifting. On the other hand, the viewer may request that a particular video program be shown during the following week, and if that program is one of the most popular programs for that week, the program may be shown every day of the following week during prime time. Otherwise, the requested program may be broadcast during a non-prime time period and recorded and replayed by the viewer. In such a manner, the viewer is guaranteed that a requested program will be made available within a week without repeated trips to a video store.

To provide a selection for a large number of video programs, a plurality of cable channels of course will be needed. For example, 26 cable channels would provide the viewers with 2,028 selections for a week in the case where a single prime time period is provided for each cable channel. However, the number and duration of prime time periods for each channel is dynamic and may vary from week to week and channel to channel depending upon viewer preferences. The video program selection process thus requires a sophisticated voting system in accordance with a weighted statistical technique, for example, whereby the most requested programs are broadcast during prime time periods, while the duration of the prime time period is defined by the number of highly popular video programs. In other words, the prime time to non-prime ratio is variable and can be dynamically adjusted in accordance with the viewer preferences. Income can, of course, be generated by the broadcaster of the Home Video Club from the telephone response system as well as from a program subscription service for membership in the Home Video Club. A television program guide can also be sold.

Video program scheduler 60 may also function to prevent programming overlap in the case that a plurality of channels are used. For example, when 26 channels are used, the chances of two programs being on at the same time that the viewer wishes to record his or her desired program may be reduced to less than 4%. Video program scheduler 60 can see to it that this percentage of overlap is not unnecessarily increased by programming the respective channels to avoid any overlap. Programming repetitiveness and unnecessary overlap of video programming may thus be eliminated in accordance with the invention.

Figure 4:
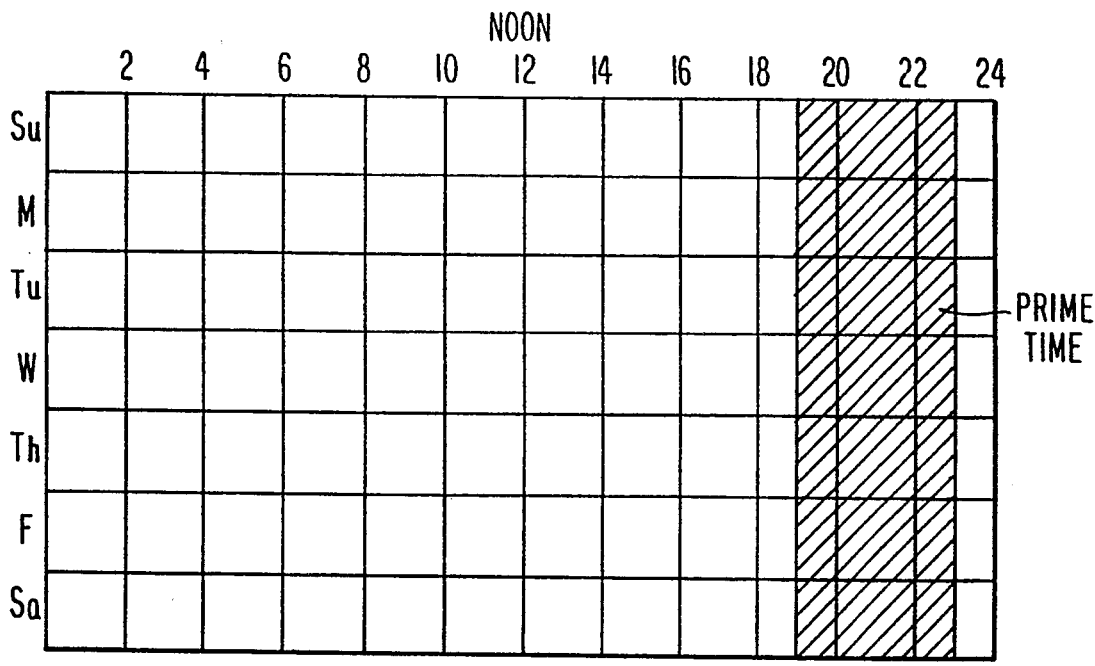
FIG. 4 schematically depicts a master schedule having a prime time period of 7 to 11 P.M. during which two or more "popular" video programs are broadcast every day of the week.

FIG. 4 represents a master schedule where viewer preferences dictate that two video programs be displayed during an expanded prime time. In other words, the prime time slot has a duration of four hours so that two video programs may be shown every day during the week. As in the embodiment of FIG. 3, non-prime time video programs (in this case 10) are shown each day during the other time periods. As a result, 72 video programs may be shown on that channel for a given week.

Figure 5:
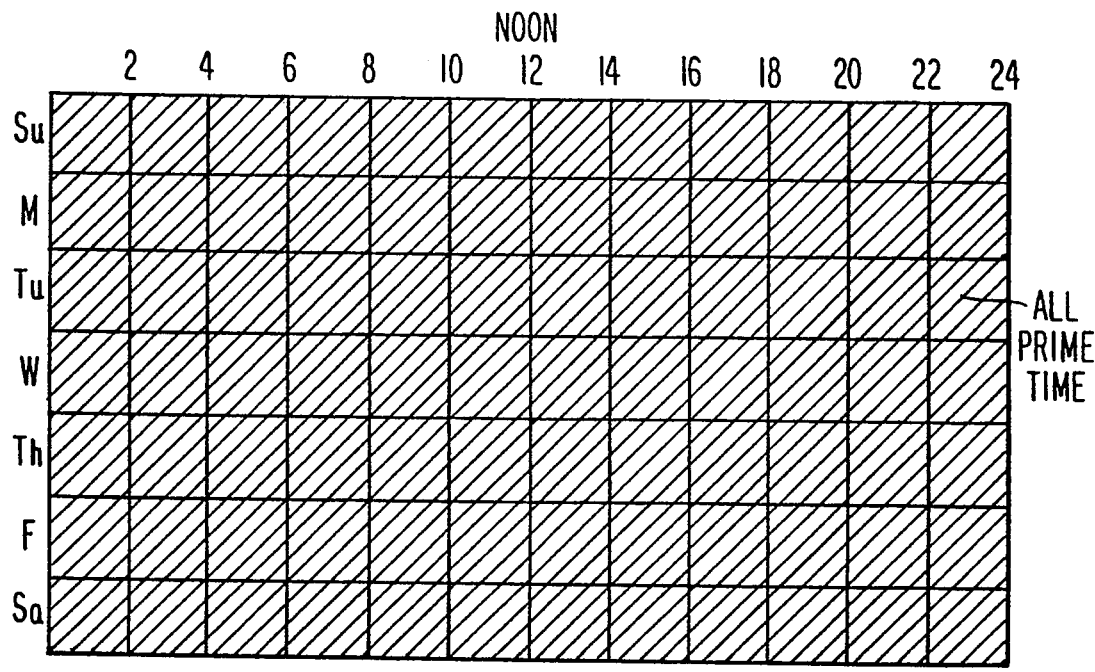
FIG. 5 schematically depicts a master schedule having only "prime time" slots, whereby the same video programs are broadcast at the same time every day for a given week.

FIG. 5 represents a further example where twelve prime time slots are allocated for each day so that only the twelve most popular programs in accordance with the viewer preferences are shown in a given week on a particular cable channel. As in the other arrangement, the subscriber may then videotape and time-shift the desired program by referring to the program guide. Of course, many more channels will be required to broadcast all of the programs in the video library 20. However, such a schedule may be particularly desirable when one of the cable channels is used as a "recent release" channel, whereby any viewer can access a new release within 24 hours.

Figure 6:
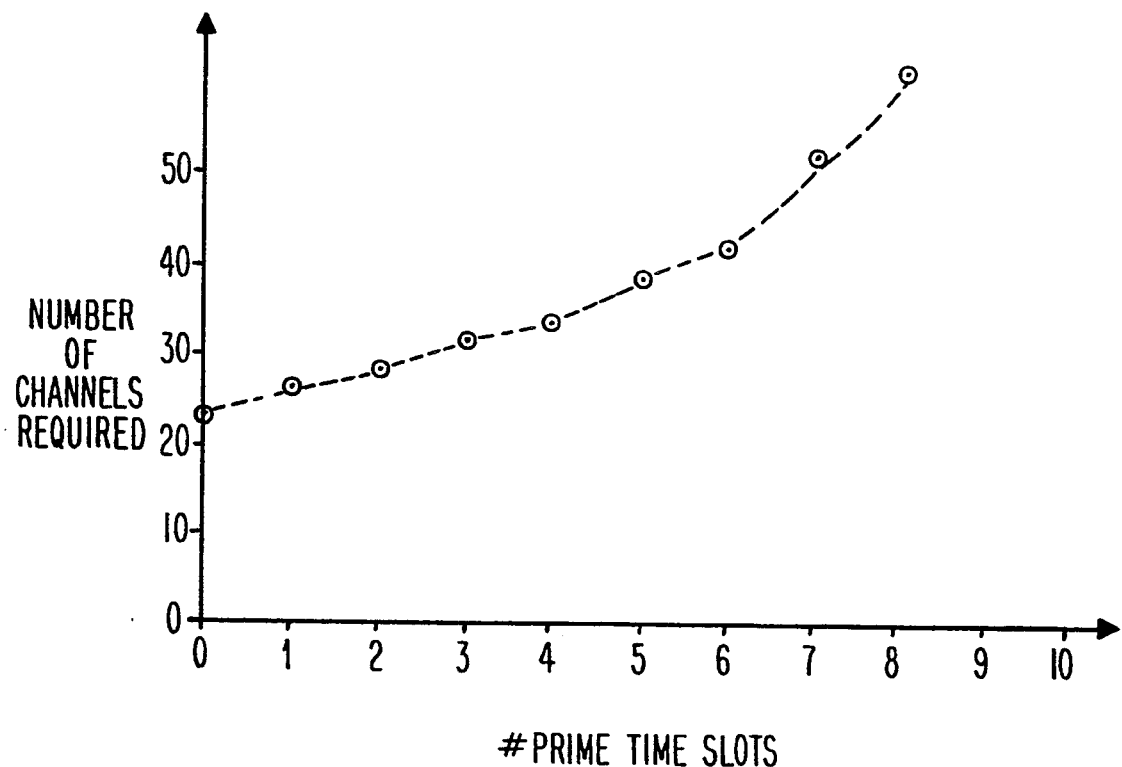
FIG. 6 graphically depicts the number of cable channels required for differing numbers of programs per channel in order to provide access to all of the video programs in the video library in a given week.

FIG. 6 graphically depicts the channel requirement versus the number of two hour prime time slots on each channel. In particular, the graph of FIG. 6 shows that as the number of prime time slots increases, the number of programs which may be shown on each channel in a given week is correspondingly reduced, thereby requiring more channels in order to provide access to all of the video programs in the video library 20. In other words, the number of channels required to provide access to all of the video programs in the video library 20 is defined as the number of total programs in the video library 20 divided by the number of programs which may be transmitted per channel. The number of programs per channel is, in turn, defined by the number of two hour time periods in a given week (84) minus 6 multiplied by the number of two-hour prime time slots.

Of course, many different scheduling variations are possible within the scope of the invention by varying the durations of the video program slots and/or prime time slot sizes as well as by varying the statistical technique used to determine which shows are to be shown during the different time periods. The simplest and presently preferred technique is to give priority to the most requested programs and to show these programs during the prime time periods. For example, the prime time programs may be those video programs receiving greater than a predetermined percentage of the overall votes of the members of the Home Video Club for a particular week. The tabulated votes may then be processed by video program scheduler 60 to determine which shows are to be shown and at what times, and the schedule may then be printed out as a program guide distributed to the members of the Home Video Club. In this manner, the viewers will know when their requested program is to be shown. They may then set their VCRs to record and time-shift the program so that they can view it at their leisure. In addition, obscure programs which otherwise might never be selected by any deterministic scheme may be selected on a random basis in order to guarantee that all available programming will be eventually scheduled for presentation.

Accordingly, the present invention provides maximum convenience to the viewers without the cost associated with similar prior art arrangements. Moreover, although only an exemplary embodiment of the invention has been described in detail above, one skilled in the art will readily appreciate that many modifications are possible within the scope of the invention without materially departing from the novel teachings and advantages of the invention.

For example, video program scheduler 60 may be dedicated hardware or a microprocessor under software control in accordance with the invention. The different cable channels also can be programmed in tandem to avoid overlap, and video programs may be randomly or statistically selected to fill unfilled time periods. Of course, certain less known movies may be scheduled to fill programming gaps, or in turn, one cable channel may be dedicated to requests for less known video programs. The programming on different channels may also be appropriately rearranged to assure that all viewer needs are met such as by providing special programming channels for certain viewer requests.

Different marketing schemes for the invention are also possible. For example, different video clubs may show different types of movies or different cable channels controlled by a particular club may show different types of movies. In other words, a horror movie video club may be established or a family movie channel may exist alongside an action movie channel within a particular club. Moreover, rather than charging for each call, revenue may be raised by only counting the votes of members of the Home Video Club who have paid their monthly membership fees. Accordingly, reference should be made only to the appended claims to determine the scope of this invention.

What is claimed is:

1. A system for providing to a plurality of viewers with viewer operated video recording systems selective access to a plurality of prerecorded video programs which may be recorded and played back at each viewer's convenience, comprising:

scheduling means for defining a plurality of future viewing periods in which selected prerecorded video programs will be transmitted, for receiving viewer video program preferences from said plurality of viewers for video programs to be transmitted to each of said plurality of viewers during said future viewing periods, and for selecting the prerecorded video programs to be transmitted to each of said plurality of viewers during each of said defined future viewing periods in accordance with a selection priority determined by tabulating all of the viewer video program preferences during a predetermined time period, said scheduling means subsequently establishing, responsive to the tabulated viewer video program preferences, when and how often each selected prerecorded video program is to be transmitted during said future viewing periods; and means responsive to said scheduling means for transmitting the selected prerecorded video programs to each of said plurality of viewers during respective future viewing periods in accordance with said selection priority.

2. The system in accordance with claim 1, wherein said transmitting means comprises a plurality of video cassette recorders with multiple tape changers and a cable head end.

3. The system in accordance with claim 1, wherein said scheduling means further comprises prime time scheduling means for defining a future daily prime time viewing period in accordance with said viewer video program preferences during which at least one prerecorded video program selected by a predetermined percentage of the viewers is to be transmitted daily.

4. The system in accordance with claim 3, wherein said transmitting means transmits the at least one selected prerecorded video program for seven consecutive days during said prime time viewing period.

5. The system in accordance with claim 4, wherein said scheduling means further includes means for tabulating said viewer video program preferences on a weekly basis.

6. The system in accordance with claim 3, wherein said transmitting means transmits said selected prerecorded video programs over respective transmission channels to said viewer operated video recording systems, each transmission channel having a prime time viewing period.

7. The system in accordance with claim 6, wherein said transmission channels are cable television channels.

8. The system in accordance with claim 3, wherein said scheduling means defines said future viewing periods to each have a duration of two hours such that 84 viewing periods are available in a week.

9. The system in accordance with claim 8, wherein said prime time scheduling means defines said prime time viewing period so that it occurs during the same viewing period each day and said transmitting means transmits the at least one selected prerecorded video program during said prime time viewing period during each day of said week, thereby enabling at least 78 different prerecorded video programs to be provided to said plurality of viewers during said week.

10. The system in accordance with claim 8, wherein said prime time scheduling means defines said prime time viewing period to have a duration of two viewing periods.

11. The system in accordance with claim 10, wherein said prime time scheduling means defines said prime time viewing period so that is occurs during the same two viewing periods each day and said transmitting means transmits two selected prerecorded video programs during said prime time viewing period during each day of said week, thereby enabling at least 72 different selected prerecorded video programs to be provided to said plurality of viewers during said week.

12. The system in accordance with claim 3, wherein said prime time scheduling means defines said prime time viewing period to have a duration of 24 hours in which a plurality of prerecorded video programs are repeated for each day of the week.

13. The system in accordance with claim 1, further comprising at least one of a telephone, a facsimile device and written ballots for conveying said viewer video program preferences to said scheduling means.

14. A method of providing to a plurality of viewers with viewer operated video recording systems selective access to a plurality of prerecorded video programs which may be recorded and played back at each viewer's convenience, comprising the steps of:
defining a plurality of future viewing periods in which selected prerecorded video programs will be transmitted;
receiving viewer video program preferences from said plurality of viewers for video programs to be transmitted to each of said plurality of viewers during said future viewing periods;
selecting the prerecorded video programs to be transmitted to each of said plurality of viewers during each of said defined future viewing periods in accordance with a selection priority determined by tabulating all of the viewer preferences during a predetermined time period and subsequently establishing, responsive to the tabulated viewer preferences, when and how often each selected prerecorded video program is to be transmitted during said future viewing periods; and
transmitting the selected prerecorded video programs to each of said plurality of viewers during respective future viewing periods in accordance with said selection priority.

15. The method in accordance with claim 14 comprising the further step of defining a future daily prime time viewing period in accordance with said viewer video program preferences during which at least one prerecorded video program selected by a predetermined percentage of the viewers is to be transmitted daily.

16. The method in accordance with claim 15, wherein said transmitting step comprises the step of transmitting the at least one selected prerecorded video program for seven consecutive days during said prime time viewing period.

17. The method in accordance with claim 15, wherein said transmitting step includes the step of transmitting said selected prerecorded video programs over respective transmission channels to said viewer operated video recording systems, each transmission channel having a prime time viewing period.

18. The method in accordance with claim 15, wherein said defining step includes the step of defining said future viewing periods to each have a duration of two hours such that 84 viewing periods are available in a week.

19. The method in accordance with claim 18, wherein said prime time viewing period defining step includes the step of defining said prime time viewing period so that it occurs during the same viewing period each day and said transmitting step includes the step of transmitting the at least one selected prerecorded video program during said prime time viewing period during each day of said week, thereby enabling at least 78 different prerecorded video programs to be provided to said plurality of viewers during said week.

20. The method in accordance with claim 18, wherein said prime time viewing period defining step defines said prime time viewing period to have a duration of two viewing periods.

21. The method in accordance with claim 20, wherein said prime time viewing period defining step includes the step of defining said prime time viewing period so that it occurs during the same two viewing periods each day and said transmitting step includes the step of transmitting two selected prerecorded video programs during said prime time viewing period during each day of said week, thereby enabling at least 72 different selected prerecorded video programs to be provided to said plurality of viewers during said week.

22. The method in accordance with claim 15, wherein said prime time viewing period defining step includes the step of defining said prime time viewing period to have a duration of 24 hours in which a plurality of prerecorded video programs are repeated for each day of the week.

23. A system for providing to a plurality of viewers with viewer operated video recording systems selective access to a plurality of prerecorded video programs which may be recorded and played back at each viewer's convenience, comprising:
   means for scheduling a plurality of future viewing periods during which selected prerecorded video programs will be transmitted;
   means for receiving and tabulating viewer video program preferences from said plurality of viewers for video programs to be transmitted to each of said plurality of viewers during said future viewing periods;
   means responsive to said receiving and tabulating means for selecting the prerecorded video programs to be transmitted to each of said plurality of viewers during each of said defined future viewing periods defined by said scheduling means in accordance with a selection priority determined by tabulating said viewer preferences; and
   means responsive to said selecting means for transmitting the selected prerecorded video programs to each of said plurality of viewers during respective future viewing periods in accordance with said selection priority, whereby at least one prerecorded video program selected by a predetermined percentage of the viewers is transmitted to each of said plurality of viewers each day during a variable prime time viewing period for a predetermined number of days.

24. The system in accordance with claim 23, wherein said transmitting means comprises a plurality of video cassette recorders with multiple tape changers and a cable head end.

25. The system in accordance with claim 23, wherein the predetermined number of days is 7.

26. The system in accordance with claim 23, wherein said means for receiving and tabulating viewer preferences includes means for tabulating said viewer preferences for a predetermined period preceding said predetermined number of days.

27. The system in accordance with claim 23, wherein said transmitting means transmits said selected prerecorded video programs over at least one cable television channel.

28. The system in accordance with claim 23, further comprising at least one of a telephone, a facsimile device and written ballots for conveying said viewer video program preferences to said scheduling means.

29. The system in accordance with claim 23, wherein said receiving, selecting and scheduling means are together comprised of a microprocessor under software control.

30. The system in accordance with claim 23, wherein said scheduling means varies the duration of said prime time viewing period in accordance with said selection priority.

31. The system in accordance with claim 30, wherein said scheduling means divides said variable prime time viewing period into at least two contiguous viewing periods in accordance with said selection priority.

32. The system in accordance with claim 30, wherein said scheduling means divides said variable prime time viewing period into more than one noncontiguous viewing period in accordance with said selection priority.

33. The system in accordance with claim 32, wherein said scheduling means varies the timing of said noncontiguous prime time viewing periods in accordance with said selection priority.

34. A method of providing to a plurality of viewers with viewer operated video recording systems selective access to a plurality of prerecorded video programs which may be recorded and played back at each viewer's convenience, comprising the steps of:
   defining a plurality of future viewing periods in which selected prerecorded video programs will be transmitted over at least one cable television channel;
   receiving viewer video program preferences from said plurality of viewers for video programs to be transmitted to each of said plurality of viewers during said future viewing periods;
   defining a variable prime time viewing period in accordance with said viewer video program preferences during which at least one prerecorded video program selected by a predetermined percentage of the viewers is to be transmitted daily to each of said plurality of viewers, the timing and duration of said prime time viewing period varying in accordance with said viewer video program preferences;
   selecting the prerecorded video programs to be transmitted to each of said plurality of viewers during each of said defined future viewing periods and said defined prime time viewing period in accordance with a selection priority determined by tabulating said viewer video program preferences; and
   transmitting the selected prerecorded video programs to each of said plurality of viewers during at least one of respective future viewing periods and respective future prime time viewing periods in accordance with said selection priority.

* * * * *